United States Patent [19]
Brav

[11] Patent Number: 5,159,317
[45] Date of Patent: Oct. 27, 1992

[54] SYSTEM AND METHOD FOR REMOTE TELEPHONIC STATION ACTUATION

[75] Inventor: Alan D. Brav, Beverly, Mass.

[73] Assignee: Lifeline Systems, Inc., Watertown, Mass.

[21] Appl. No.: 729,493

[22] Filed: Jul. 12, 1991

[51] Int. Cl.$^5$ .................. G08B 25/02; G08B 29/00
[52] U.S. Cl. .................. 340/574; 340/501; 340/514; 340/539; 340/825.45; 379/38
[58] Field of Search ............ 340/574, 539, 286.04, 340/501, 514, 573, 825.45; 379/38

[56] References Cited

U.S. PATENT DOCUMENTS

| | | | |
|---|---|---|---|
| 4,884,059 | 11/1989 | Shapiro | 340/589 |
| 4,884,060 | 11/1989 | Shapiro | 340/589 |
| 4,908,602 | 3/1990 | Reich et al. | 340/539 |

Primary Examiner—Glen R. Swann, III
Attorney, Agent, or Firm—Weingarten, Schurgin, Gagnebin & Hayes

[57] ABSTRACT

A home communicator includes aid request circuitry capable of establishing communication with a central monitoring station in response to a first predetermined activation step performed by a subscriber and test circuitry capable of self-testing the home communicator in response to a second predetermined activation step formed by the subscriber. The home communicator further includes enable/disable circuitry capable of transmitting an identification number to a central monitoring station in response to a third predetermined activation step with the aid request circuitry and the test circuitry being unresponsive prior to the functioning of the enable/disable circuitry.

5 Claims, 2 Drawing Sheets

SYSTEM AND METHOD FOR REMOTE TELEPHONIC STATION ACTUATION

FIELD OF THE INVENTION

The invention relates to telephonic devices and more particularly to remote telephonic devices which communicate with a central location.

BACKGROUND OF THE INVENTION

With an increasing percentage of the population comprising elderly or infirm persons living alone, the demand for a means to monitor the well-being of these individuals has increased. Although periodic visits by other individuals, such as visiting nurses or family members, provide a measure of security, and while the telephone provides a means for summoning help in an emergency, many situations immediately come to mind whereby an incapacitating emergency, such as a fall, occurs between such visits and when an individual is located some distance away from their phone.

As a result of this problem, a number of service businesses have formed which provide a monitoring service for people living alone. Typically, a person, called a subscriber, wishing to be monitored, is supplied with a home communicator. The home communicator links the person's home either by telephone or radio with a central monitoring station. Also typically, the subscriber is provided with a small personal communicator which is worn by the subscriber and which is in radio communication with the home communicator. In the event of an emergency the subscriber need only press a button on the personal communicator to cause the home communicator to notify the central monitoring station that the subscriber requests help. When the central monitoring station receives the help call from the home communicator, the central monitoring station then proceeds to call one or more individuals, called responders, who proceed to the subscriber's home to provide assistance.

In installing a home communicator in a subscriber's home, it is first necessary to establish communications with the central monitoring station to identify the subscriber and notify the central monitoring station that the home communicator is on line. The present invention relates to a system and method for establishing communication between a home communicator or other remote telephonic device and a central monitoring station and thereby automatically informing the central monitoring station that the remote station has been activated.

SUMMARY OF THE INVENTION

The invention relates to a method and system for establishing communication between a remote telephonic device and a central monitoring station. In one embodiment, the system includes a central station capable of communicating with a remote station by way of a telephone network. The remote station includes a portable personal communicator or help button which includes a radio transmitter to establish communications with a home communicator. The home communicator is capable of establishing communication with the central station in response to a predetermined action performed by a subscriber.

In one embodiment, the remote station is initially installed at the subscriber's location in an inactive state such that when the portable personal help button is pressed, a signal is transmitted to the home communicator, but the home communicator will not call the central monitoring station. Several methods are contemplated for properly activating the remote station. In a first method, the central monitoring station calls the home communicator and transmits a command, in the form of a predetermined series of tones, activating the unit. In a second method, the subscriber, after placing a call to and being in contact with the central monitoring station, presses a help button on the home communicator while simultaneously pressing a test unit button, also located on the home communicator. By holding these two buttons for a predetermined amount of time, the home communicator is instructed to transmit an identification number to the central monitoring station. Additionally, the central monitoring station can transmit a command to disable the home communicator to prevent it from calling the central monitoring station with a help request.

BRIEF DESCRIPTION OF THE DRAWINGS

Other features and benefits of the invention can be more clearly understood with reference to the specification and the accompanying drawings in which.

DESCRIPTION OF THE PREFERRED EMBODIMENT

Figure 1:
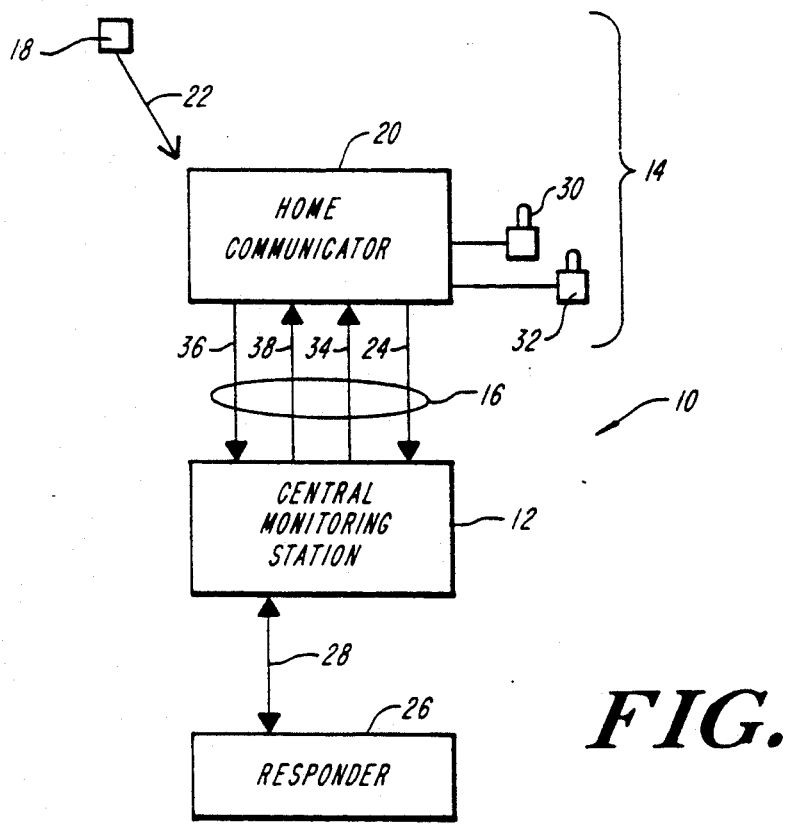
FIG. 1 is a block diagram of an embodiment of the system.

Referring to FIG. 1, in brief overview, a communications system 10 constructed in accordance with the invention includes a central station 12 capable of communicating with a remote station 14 by way of a telephone network 16. The remote station 14 includes a portable personal communicator or help button 18 which includes a radio transmitter to establish communications with a home communicator 20. The home communicator 20 is capable of establishing communication with the central station 12 in response to a predetermined action performed by a subscriber.

In the embodiment shown, the subscriber calls for assistance by pressing a button on a portable personal help button 18. The portable personal help button 18 transmits a radio signal 22 to the home communicator 20 which then calls the central monitoring station 12 over the telephone network 16 and transmits a help requested message 24. In the embodiment shown, the subscriber can also request aid by pressing a button 32 on the home communicator 20 itself. In response to the help requested message transmitted by the home communicator 20, the central monitoring station 12 calls a responder 26 over the telephone line 28 and informs the responder that the subscriber requires aid.

When the remote station 14 is initially installed at the subscriber's location, the remote station is inactive, in that when the portable personal help button 18 is pressed, the signal 22 is transmitted to the home communicator 20, but the home communicator will not call the central monitoring station 12. Several methods are contemplated for properly activating the remote station 14. In a first method, the central monitoring station 12 calls the home communicator 20 and transmits a command 34, in the form of a predetermined series of tones, activating the unit. In a second method, the subscriber, after placing a call to and being in contact with the central monitoring station 12, presses the help button 32 on the home communicator 20 while simultaneously pressing a test unit button 30, also located on the home communicator 20. By holding these two buttons 30, 32 for a predetermined amount of time, in this embodiment for three seconds, the home communicator 20 is instructed to transmit an identification number 36 to the central monitoring station 12 and become activated, that is, respond to the pressing of the portable personal help button 18 or the help button 32 by calling the central monitoring station 12. As an example, the identification number can be transmitted as a series of tones. Additionally, the central monitoring station 12 can transmit a command 38, again for example using a series of tones, to disable the home communicator 20 to prevent it from calling the central monitoring station 12 with a help request.

Figure 2:
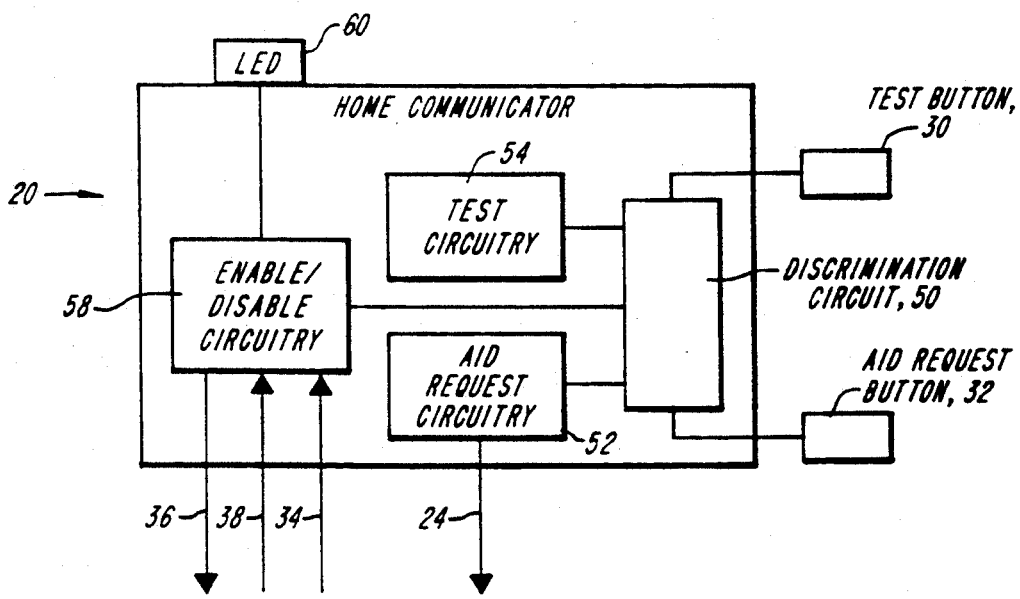
FIG. 2 is a block diagram of an embodiment of the remote station of FIG. 1.

In more detail, and referring to FIG. 2, an embodiment of the home communicator 20 includes a discrimination circuit 50 which determines if the help button 32 and the test button 30 have been simultaneously pushed. If the help button 32 has been depressed alone, the discrimination circuit 50 signals aid request circuitry 52 which dials the central monitoring station 12 and transmits a request aid signal 24. This will occur only if the home communicator 20 has been activated prior the pressing of the help button 32. If the test button 30 is depressed alone, a signal is sent to test circuitry 54 which performs tests upon the home communicator 20 to determine whether it is functioning properly. Again this only occurs if the unit has been previously properly activated.

When the home communicator 20 is installed, it is not active and this condition is indicated by all display LEDs 60 being initially on. If the portable personal help button 18 is depressed at this time, the home communicator 20 will indicate the personal help button 18 has been depressed, for example by beeping. However, the home communicator 20 will not dial the central monitoring station 12. If the discrimination circuit 50 determines that both the help button 32 and the test button 30 have been depressed simultaneously for a predetermined amount of time, the discrimination circuitry 50 signals the enable/disable circuit 58 to turn off all the LEDs 60 and transmit the home communicator identity code using tones 36. Once the identity code has been transmitted, the home communicator 20 indicates success, for example by beeping. The LEDs are then released for use as display devices for the other circuitry and the home communicator is activated. Alternatively, instead of the help button 32 and the test button 30 being used to initialize the home communicator 20, a signal 34 from the central monitoring station 12 can cause the enable/disable circuit 58 to perform the activation as just described. A special signal 38 from the central monitoring station 12 to the enable/disable circuit 58 also may be sent to cause the home communicator 20 to deactivate, that is, not dial the central monitoring station 12 to request aid.

Figure 3:
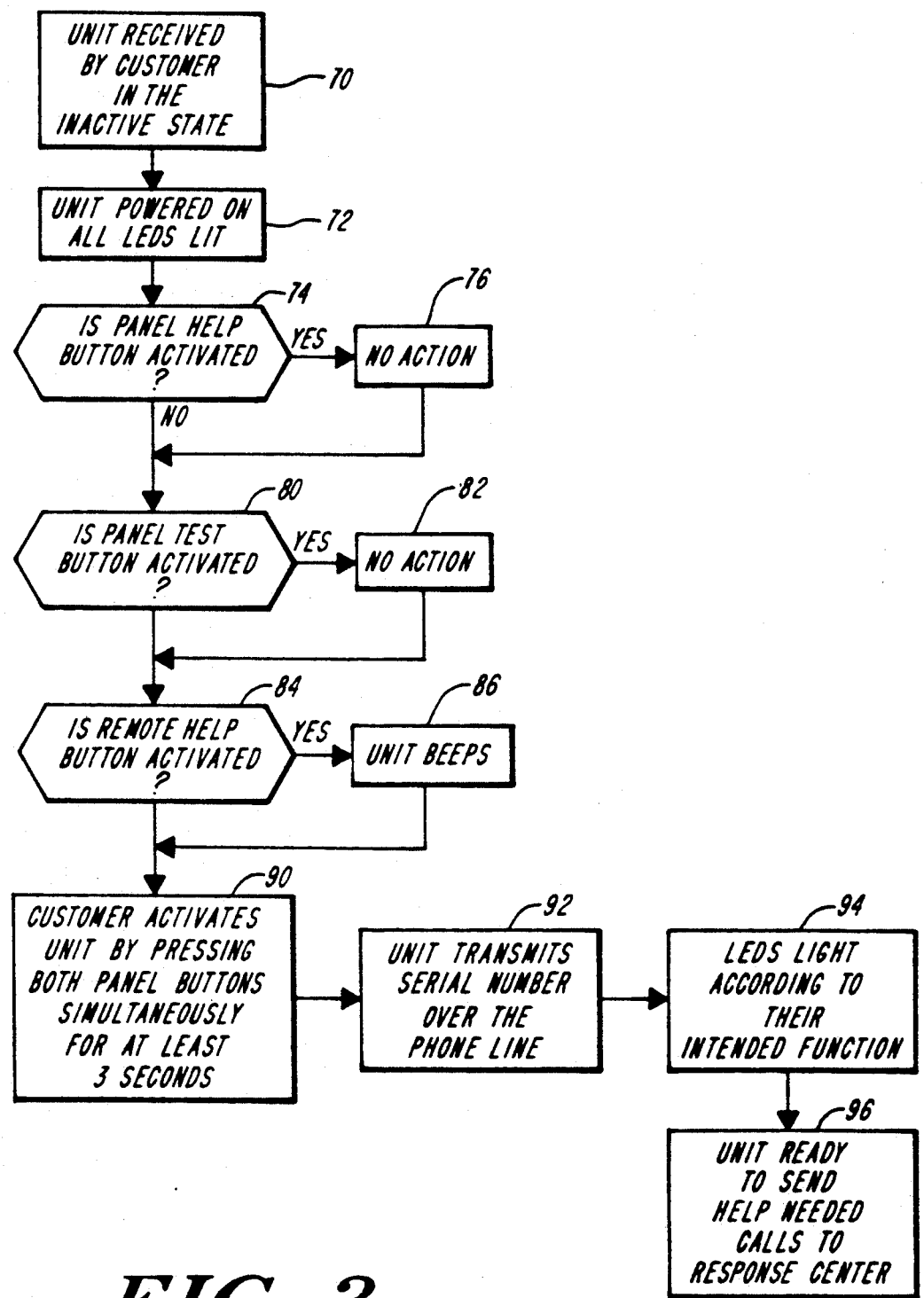
FIG. 3 is a flow chart depicting an embodiment of the operation of the embodiment of the invention shown in FIG. 1.

In FIG. 3 a flow diagram of the steps of activation just described is presented and numerals in parentheses in the following description refer to steps in the flow diagram. The home communicator 20 is received at the subscriber's location in an inactive state (70), and when the home communicator is powered on (72) all the display LEDs 60 are turned on (72). If the help button 32 on the home communicator 20 is depressed (74), no action is taken (76) because the home communicator has not been properly activated. If the test button 30 is depressed (80) again no action is taken (82) because the home communicator has not been properly activated. If the portable help button 18 is depressed (84), the home communicator 20 emits a audible signal (86), in this embodiment for as long as the help button 18 is depressed, but the home communicator 20 does not call the central monitoring station 12.

If both the help button 32 and the test button 30 are depressed for a minimum amount of time (90), in this embodiment three seconds, and assuming that the subscriber has established contact with the central monitoring station 12, the home communicator 20 transmits (92) the identification number of the home communicator 20 to the central monitoring station 12. At this point, the home communicator 20 releases (94) the LEDs 60 for their intended function by the test circuitry 54 and aid request circuitry 52. The home communicator 20 is then ready to call the central monitoring station 12 when help is required (96). Should the central monitoring station 12 send a deactivate command to the home communicator 20, the home communicator 20 returns to its inactive state (70).

These and other examples of the concept of the invention illustrated above are intended by way of example and the actual scope of the invention is to be determined solely from the following claims.

What is claimed is:

1. A home communicator comprising:
   aid request circuitry capable of establishing communication with a central monitoring station in response to a first predetermined activation step performed by a subscriber;
   test circuitry capable of self testing the home communicator in response to a second predetermined activation step performed by said subscriber; and
   enable/disable circuitry capable of transmitting an identification number to said central monitoring station in response to a third predetermined activation step,
   wherein said aid request circuitry and said test circuitry are not responsive prior to said enable/disable circuitry functioning.

2. The home communicator of claim 1 wherein said home communicator further includes a first button and said first predetermined activation step is the depressing of said first button.

3. The home communicator of claim 2 wherein said home communicator further includes a second button and said second predetermined activation step is the depressing of said second button.

4. The home communicator of claim 3 wherein said home communicator enable/disable circuitry is responsive to the third predetermined activation step of establishing contact with said central monitoring station and substantially simultaneously activating said first button and said second button for a predetermined amount of time.

5. The home communicator of claim 1 wherein said enable/disable circuitry is activated in response to a signal transmitted to said home communicator by said central monitoring station.

* * * * *